United States Patent [19]

Struewing

[11] Patent Number: 5,156,742
[45] Date of Patent: Oct. 20, 1992

[54] LIQUID TREATMENT METHOD AND APPARATUS

[75] Inventor: John W. Struewing, Overland Park, Kans.

[73] Assignee: Smith & Loveless, Inc., Lenexa, Kans.

[21] Appl. No.: 841,022

[22] Filed: Feb. 25, 1992

[51] Int. Cl.$^5$ .............................................. C02F 3/06
[52] U.S. Cl. .................................. 210/605; 210/615; 210/621; 210/629; 210/151; 210/195.1; 210/903
[58] Field of Search ............... 210/607, 615, 617, 621, 210/629, 605, 903, 150, 151, 194, 195.1, 202, 220, 221.2

[56] References Cited

U.S. PATENT DOCUMENTS

| | | | |
|---|---|---|---|
| 3,043,933 | 7/1962 | Singer | 210/629 |
| 3,126,333 | 3/1964 | Williams | 210/617 |
| 3,878,097 | 4/1975 | Mochizuki et al. | 210/151 |
| 3,966,599 | 6/1976 | Burkhead | 210/151 |
| 3,966,608 | 6/1976 | Mason et al. | 210/151 |
| 4,388,192 | 6/1983 | Hellqvist | 210/615 |
| 4,933,076 | 6/1990 | Oshim et al. | 210/629 |
| 5,076,929 | 12/1991 | Fuchs et al. | 210/903 |

Primary Examiner—Stanley S. Silverman
Assistant Examiner—Christopher Upton
Attorney, Agent, or Firm—Dressler, Goldsmith, Shore, Sutker & Milnamow, Ltd.

[57] ABSTRACT

An improved method and apparatus for treating liquor containing biodegradable wastes wherein the liquor is first delivered to a quiescent primary settling zone and then to an aeration zone. The aerated liquor is delivered downwardly through a column of submerged fixed media having a high surface area to volume ratio so that aerobic microorganisms can grow on their surface. The liquor is recirculated through the aeration zone and fixed media, and is withdrawn from the unit after treatment. A portion of the aerated liquor from the top of the fixed media is recycled back into the primary settling zone to denitrify the nitrate rich aerated liquor by deoxygenating the dissolved nitrates and to equalize the BOD load in the secondary aerobic treatment zone.

19 Claims, 2 Drawing Sheets

LIQUID TREATMENT METHOD AND APPARATUS

FIELD OF THE INVENTION

The present invention relates generally to the treatment of biodegradable waste products. More particularly, the invention relates to new and improved methods and apparatus utilizing aerobic microbial growth on fixed media for biological oxidation of raw sewage to produce an effluent having reduced dissolved nitrates.

BACKGROUND OF THE INVENTION

At the present time, most single-family homes and small multiple-family homes that are not connected to a central sewer system employ a septic tank system for the disposal of biodegradable wastes, particularly sewage. These tanks are generally of very low efficiency in processing these wastes, and, as a result, often tend to pollute the environment. Because of the well known pollution problems that are generated by septic tank systems, regulatory authorities in many area have banned the use of such tanks, and it is expected that such bans will become more prevalent in the future. Accordingly, there is a need for a high-efficiency unit for the treatment of biodegradable wastes which is compact, inexpensive, and can be used to provide such treatment for single-family dwellings and small multiple-family dwellings.

Generally, such units provide a means for treating a liquor containing biodegradable wastes which comprises delivering the liquor to a quiescent settling zone, in which large particles are permitted to settle to the bottom where they are subjected to digestion by anaerobic microorganisms. The liquor is delivered from the settling zone to an aeration zone, where it is aerated, and then delivered downwardly through a column of submerged fixed media. The fixed media is composed of a multiplicity of elements which are freely and randomly stacked on one another to provide interstitial area between them. These elements have a high surface area to volume ratio, so that aerobic microorganisms can grow on their surface to treat biodegradable wastes contained in the liquor. As a result of their random stacking and high surface area, the elements promote homogeneous contact of the liquor with the fixed media. The liquor is received at the bottom of the fixed media and recirculated through the aeration zone and back through the fixed media in order to provide multiple passes through the media for thorough treatment. After such treatment, the effluent that has passed through the fixed media is withdrawn from the unit.

Examples of such units are disclosed in U.S. Pat. Nos. 3,966,599, 3,966,608 and 3,972,965, which patents are commonly assigned to the same assignee as the present invention.

These small aerobic sewage treatment units achieve very good results in treating household and small commercial waste waters in reduction of pollutants discharged to the environment. However, nutrients, such as phosphorous and nitrogen, may pass through these units at concentrations high enough to be considered detrimental to the environment or the ground water. In sewages, nitrogen is typically present in the trinegative forms of ammonia and organically bound nitrogen. The excess nitrogen over the quantity required by the biological treatment process is normally oxidized to nitrate-nitrogen ($NO_3$—N) and concentrations in the effluents may range from 10 to 30 mg/l. Many regulatory agencies are requiring that total nitrogen and specifically nitrate-nitrogen levels be reduced to lower levels.

The known biological process of denitrification involves the conversion of the nitrate-nitrogen to a gaseous nitrogen species. The gaseous product is primarily nitrogen gas but also may be nitrous oxide or nitric oxide. Gaseous nitrogen is relatively unavailable for biological growth thus denitrification converts nitrogen which may be in an objectionable form to one which has no significant effect on environmental quality. A relatively broad range of bacteria can accomplish denitrification. These organisms use either nitrate or oxygen as the terminal electron acceptors while oxidizing organic matter. Nitrate reduction is accomplished by a nitrate dissimilation process whereby nitrate or nitrite replaces oxygen in the respiratory process of the organism under anoxic conditions. This process is known as anoxic denitrification.

The heretofore small aerobic sewage treatment units have tended to have uneven BOD loading in the aeration section due to uneven influent flow rates into the unit. As a consequence, the effluent quality has been inconsistent in situations where the unit cycles between periods of light and heavy loading.

Accordingly, there is a need for an improved method and apparatus for treatment of liquor containing biodegradable waste material, such as sewage, that reduces the total nitrogen discharged in the effluent and that is able to maintain consistent effluent quality during cycles of uneven influent loading.

SUMMARY OF THE INVENTION

Generally, the present invention provides improved methods and apparatus utilizing aerobic microbial growth on fixed media for biological oxidation of raw sewage to produce an effluent having reduced dissolved nitrates. In accordance with a unique aspect of the invention, a portion of the aerated liquor from the top of the fixed media is recycled back into the primary settling zone to denitrify the nitrate rich aerated liquor by deoxygenating the dissolved nitrates. The recycling of the aerated liquor from the secondary aerobic treatment zone into the primary settling zone also equalizes the BOD load in the secondary aerobic treatment zone.

In accordance with preferred embodiments of the invention, the average volume of the recycled aerated liquor is from about 1.0 to about 3.0 times the average volumes of the influent liquor or from about 1.5 to about 5.0 times the volume of liquid in the secondary aerobic treatment.

In accordance with preferred embodiments of the apparatus of the invention, the apparatus comprises a settling tank defining a primary settling zone. The settling tank is provided with an inlet for introducing influent liquor into the primary settling zone. A reactor chamber communicates with the settling tank through a lower inlet means. A column of fixed media material, defining a multiplicity of flow paths, is positioned in the reactor chamber. A draft tube, defining a vertical flow passageway, extends through the media material. An aeration means introduces air into the liquor and draws the liquor upwardly through the draft tube for distribution above the media. A recycle means, including a conduit extending between the primary settling zone and the reactor chamber, recycles a portion of the aerated liquor from the top of the media volume back into the primary settling zone to equalize the BOD load in the reactor chamber and to denitrify the nitrate rich aerated liquor by deoxygenating the dissolved nitrates. The aeration means recirculates the liquor in the reactor chamber through the media column and the flow passageway. An outlet withdraws effluent from the reactor chamber.

The invention, its construction and method of operation, together with the advantages thereof, will be best understood by reference to the following detailed description, taken in conjunction with the drawings.

DESCRIPTION OF THE PREFERRED EMBODIMENTS

Figure 1:
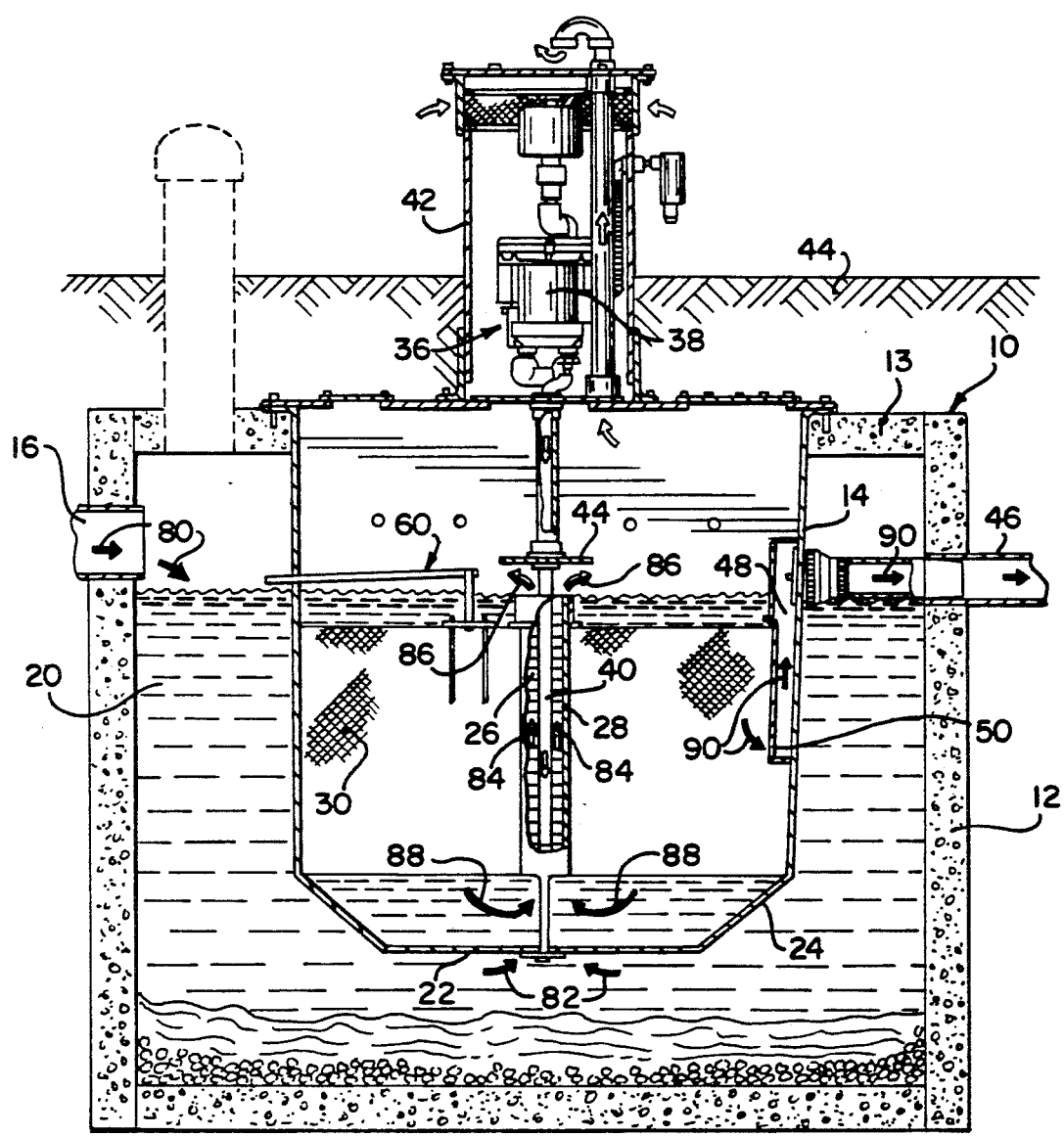
FIG. 1 is a cross-sectional view of an apparatus embodying the features of the present invention.

Referring to FIG. 1, an exemplary treatment apparatus of the type contemplated to embody the features of the present invention is generally indicated by the reference numeral 10. Apparatus 10 includes a tank 12 having a top cover 13, within which is disposed a reactor 14. Tank 12 has an inlet pipe 16 communicating with an upper portion thereof. The main portion of tank 12 forms a settling and anaerobic digestion section or primary settling zone 20. Reactor 14 has an opening 22 in the bottom thereof, formed by baffles 24. Liquid from the settling and anaerobic digestion area 20 passes into the reactor through the opening 22. A section of pipe 28 defines a central flow passageway or draft tube 26 in reactor 14. Flow passageway 26 is surrounded by fixed media 30 which is contained between the walls of the reactor 14 and the central flow passageway 26. Fixed media 30 is supported above the opening 22.

The fixed media 30 may be any suitable material having a high ratio of void space to volume. Preferably, such material should have at least about 80% void volume, and most preferably at least about 90%, to produce a high surface area to volume ratio and a low impedance to liquid flow. The fixed media 30 should also have a surface which is receptive to aerobic microbial growth. An example of such fixed media is BIOdek, manufactured by Munters Company.

In order to provide for aerobic digestion of bacteria, it is essential that an aeration means be provided. As shown in FIG. 1, this particular apparatus employs an air lift assembly 36, of well known construction, having a compressor motor 38 which directs air down a tube 40 disposed within flow passageway 26. Motor 38 is located in an equipment manway compartment 42 mounted above tank 12. Air under pressure is delivered to the bottom portion of flow passageway 26, which results in rising air bubbles producing a motive force that aerates and recirculates the liquid upwardly through the flow passageway 26. As the recirculating liquid reaches the upper end of the draft tube 28 it is sprayed upwardly into contact with a deflector plate 44, which deflects the recirculating liquid outwardly above the liquid surface in reactor 14.

In the preferred embodiment shown, the liquid treatment apparatus 10 is buried in the earth 44. Access and air is provided through equipment/manway compartment 42 in a manner which is well known in the art.

Treated liquid flows out of the reactor 14 through an effluent or outlet pipe 46 which is located at a level above the top of the fixed media 30. Outlet pipe 46 communicates with a conventional control weir and effluent box 48 located in reactor 14 that has a submerged opening 50 associated therewith.

Figure 2:
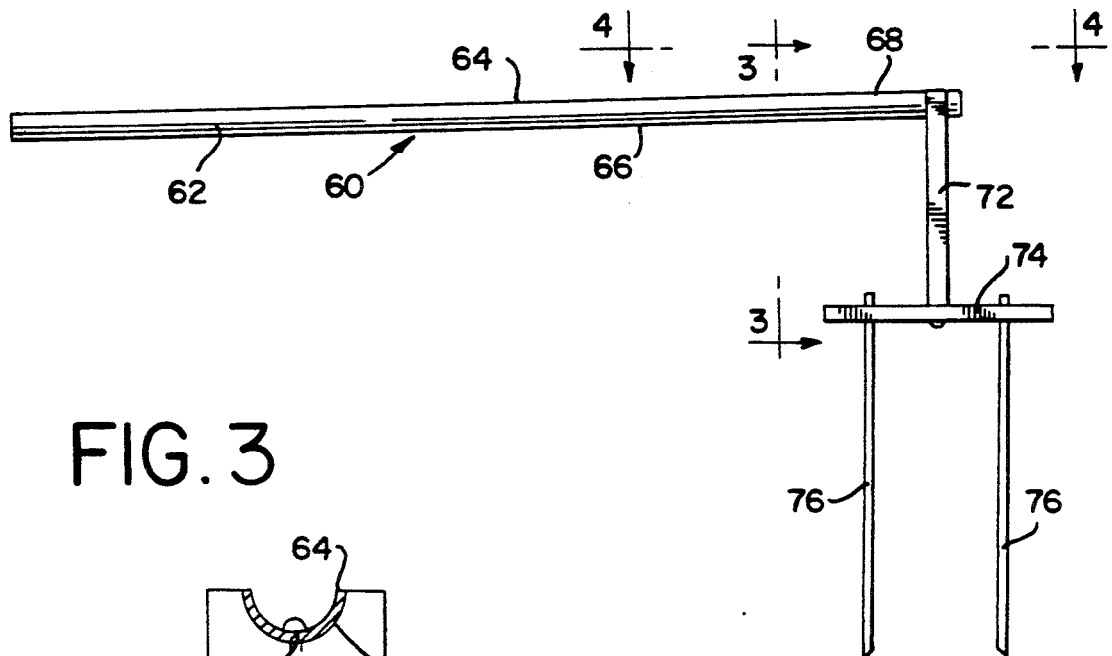
FIG. 2 is an elevational view of the recycle assembly in accordance with the invention.
Figure 3:
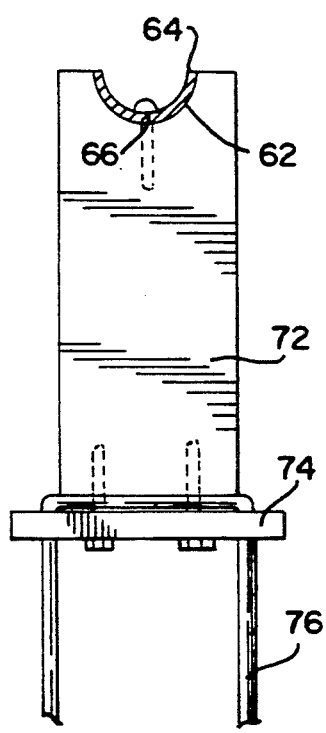
FIG. 3 is a cross-sectional view taken along line 3—3 in FIG. 2.
Figure 4:
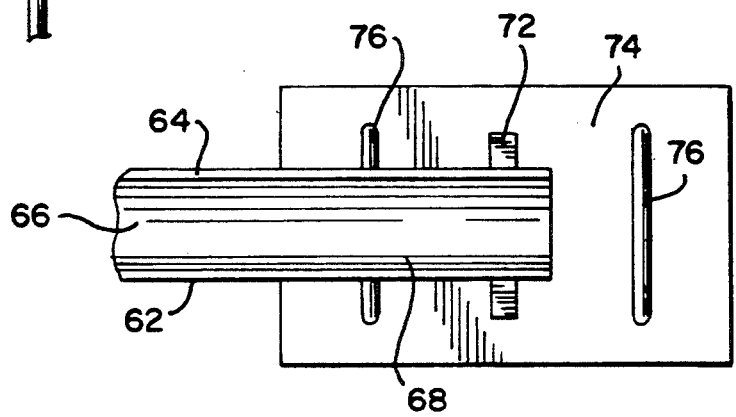
FIG. 4 is a cross-sectional view taken along line 4—4 in FIG. 3.

In accordance with a unique aspect of the invention, a recycle assembly 60 is provided to recycle a portion of the aerated liquor spray at the liquid surface of the reactor 14. Referring to FIGS. 2-4, recycle assembly 60 includes a conduit 62 that is supported within reactor 14 adjacent the liquid level therein. In accordance with a preferred embodiment of the invention, conduit 62 is an elongated channel or through member having an open upper top portion 64 and a closed bottom portion 66. The bottom portion 66 of conduit 62 may be located below, at, or above the liquid level in reactor 14. The top portion 64 of conduit 62 is located above the liquid level in reactor 14. Conduit 62 has an inner end portion 68 that is located adjacent the upper end portion of draft tube 26 and deflector plate 44 so that a portion of the aerated liquor spray at the liquid surface of the reactor 14 is directed thereinto. Conduit 62 has an outer end portion 70 that extends through an opening in reactor 14 into primary settling zone 20. Conduit 62 is inclined downwardly from the reactor 14 toward the primary settling zone 20 to direct aerated liquor entering conduit 62 back into primary settling zone 20.

Conduit 62 may be supported in reactor 14 in any one of many suitable ways. For example, the inner end portion 68 may be supported in a cradle member 72, which in turn is supported above the fixed media 30 on a plate member 74. A pair of spaced apart U-shaped rod members 76 extend through openings in plate member 74 and into the fixed media 30.

In operation, a liquor containing biodegradable wastes, generally in both dissolved and undissolved forms, is delivered to the tank 12 through inlet pipe 16, as indicated by arrows 80 in FIG. 1. The liquid passes into the settling and anaerobic digestion area or primary settling zone 20, which is relatively quiescent due to the low flow rates and lack of agitation. Floatable materials are degraded on the surface of the primary settling zone 20 and, after degradation, the remaining solids settle to the bottom of tank 12. A large portion of the particulate matter contained in the liquor settles to the bottom of tank 12, where it is digested by the anaerobic bacteria which exists within the biodegradable material.

The liquor passes from the settling and anaerobic digestion area 20 into the reactor 14 through the opening 22 in the lower portion thereof, as indicated by arrows 82 in FIG. 1. The liquid then passes upwardly through the central flow passageway 26, as indicated by arrows 84 in FIG. 1. This upward movement is produced by the upwardly rising stream of air bubbles introduced through the tube 40.

After the liquid reaches the top of the passageway 26, it is sprayed upwardly into contact with deflector plate 44, which deflects the recirculating liquid outwardly above the liquid surface in reactor 14, as indicated by arrows 86 in FIG. 1. Most of the sprayed liquid is distributed in a relatively even manner over the top of the fixed media 30. The liquor passes downwardly through the fixed media 30 where it is aerobically digested by the microorganisms on the surface thereof. Any solids that are released from the fixed media 30 pass downwardly into the settling zone 20, where they may be periodically collected.

After the liquor has made a pass through the fixed media 30, it again passes upwardly through the central flow passageway 26, and is recirculated through the fixed media, as indicated by arrows 88 in FIG. 1. This recirculation occurs a number of times before the liquid is withdrawn from the unit through the effluent box 48 and the outlet pipe 46, as indicated by arrows 90 in FIG. 1.

In accordance with a unique feature of the present invention, a portion of the aerated nitrate rich liquor spray from above the media 30 in reactor 124 is recycled back into the primary settling zone 20 in order to denitrify the nitrate rich aerated liquid by deoxygenating the dissolved nitrates and to equalize the BOD load in the secondary aerobic treatment zone in reactor 14. A portion of the aerated liquor spray is received and collected in conduit 62 through which it is directed back into primary settling zone 20. The volume of recycled aerated liquor is preferably from about 1.0 to about 3.0 times the average volume of the influent liquor, most preferably about 2.0 times the average volume of the influent liquor. The average volume of recycled aerated liquor is preferably from about 1.5 to about 5.0 times the volume of liquid in the reactor chamber 14. The detention time of the raw liquor in the secondary treatment zone is preferably from about 6 to 12 hours.

Many modifications and variations of the invention as hereinbefore set forth will occur to those skilled in the art, and it is intended to cover in the appended claims all such modifications and variations as fall within the true spirit and scope of the invention.

What is claimed is:

1. A method for treating a liquor containing biodegradable waste material, comprising:
    (a) introducing the influent liquor into a primary settling zone;
    (b) directing a portion of the liquor from the primary settling zone into the bottom of a secondary aerobic treatment zone having a column of submerged fixed media material, said media defining a multiplicity of flow paths and having a volumetric void space of at least 80%;
    (c) directing the liquor from the bottom of the column to the top of the column;
    (d) simultaneously aerating the liquor at the top of the media column and distributing a portion of the aerated liquor over the top of said media column to cause said liquor to flow downwardly through said media column and to be split into a multiplicity of individual streams so as to promote intimate contact of the liquor with the media and provide sufficient oxygen to promote microbial growth on the media;
    (e) recycling another portion of the aerated liquor from the top of the media column back into the primary settling zone to equalize the BOD load in the secondary aerobic treatment zone and to denitrify the nitrate rich aerated liquor by deoxygenating the dissolved nitrates;
    (f) recirculating the liquor through steps (c), (d) and (e);
    (g) removing a portion of effluent that has passed through the media column; and
    (h) collecting residual solids in a sediment receiving zone positioned below the secondary aerobic treatment zone.

2. The method as defined in claim 1 wherein the average volume of the aerated liquor recycled in step (d) is from about 1.0 to about 3.0 times the average volume of the influent liquor.

3. The method as defined in claim 2 wherein the average volume of the aerated liquor recycled in step (d) is about 2.0 times the average volume of the influent liquor.

4. The method as defined in claim 1 wherein the average volume of the aerated liquor recycled in step (d) is from about 1.5 to about 5.0 times the volume of liquid in the secondary aerobic treatment zone.

5. The method as defined in claim 1 wherein the liquor recirculated in step (f) is directed upwardly through a draft tube located in the media column.

6. The method as defined in claim 5 wherein the liquor is directed upwardly through the draft tube by an air lift means extending into the draft tube.

7. The method as defined in claim 5 wherein the aerated liquor recycling in step (d) is through a conduit extending between the primary settling zone and the secondary aerobic treatment zone.

8. The method as defined in claim 7 wherein the liquor directed upwardly through the draft tube is deflected by a deflector plate in a flow pattern above the surface of the liquor in the secondary aerobic treatment zone.

9. The method as defined in claim 8 wherein the conduit is an open channel located above the surface of the liquor in the secondary aerobic treatment into which a portion of the liquor flow pattern is received.

10. The method as defined in claim 1 wherein the aerated liquor recycling in step (d) is through a conduit extending between the primary settling zone and the secondary aerobic treatment zone.

11. An apparatus for treating a liquor containing biodegradable waste material, comprising: a settling tank means defining a primary settling zone, said settling tank having an inlet communicating with an upper portion thereof; a reactor chamber having a lower inlet means communicating with said settling tank; a column of fixed media material positioned to be submerged within said reactor chamber, said media defining a multiplicity of flow paths and having a volumetric void space of at least about 80%; a substantially vertical flow passageway position in said reactor chamber and extending through said media; aeration means extending into said reactor chamber for introducing air into said liquor and drawing liquor upwardly through said flow passageway to the top of said media column; recycle means for recycling a portion of the aerated liquor from the top of said media column back into said primary settling zone to equalize the BOD load in said reactor chamber and to denitrify the nitrate rich aerated liquor by deoxygenating the dissolved nitrates; means for recirculating another portion of said aerated liquor in said reactor chamber downwardly through said media column and upwardly through said flow passageway; and means for withdrawing treated effluent from said reactor chamber.

12. The apparatus as defined in claim 11 wherein said recycle means has a capacity to recycle a volume of aerated liquor that is from about 1.0 to about 3.0 times the average volume of the influent liquor.

13. The apparatus as defined in claim 11 wherein said recycle means has a capacity to recycle a volume of aerated liquor that is about 2.0 times the average volume of the influent liquor.

14. The apparatus as defined in claim 11 wherein said recycle means has a capacity to recycle a volume of aerated liquor that is from about 1.5 to about 5.0 times the volume of liquid in said reactor chamber.

15. The apparatus as defined in claim 11 wherein said recycle means includes a conduit means extending between said primary settling zone and said reactor chamber.

16. The apparatus as defined in claim 15 wherein said conduit means is an open channel member positioned to be above the surface of the liquor in said reactor chamber.

17. The apparatus as defined in claim 16 wherein said conduit means is inclined downwardly from said reactor chamber toward said primary settling zone.

18. The apparatus as defined in claim 15 wherein said flow passageway comprises a draft tube extending through said media.

19. The apparatus as defined in claim 18 wherein said aeration means comprises an air lift means extending into said draft tube.

* * * * *

UNITED STATES PATENT AND TRADEMARK OFFICE
CERTIFICATE OF CORRECTION

PATENT NO. : 5,156,742

DATED : October 20, 1992

INVENTOR(S) : John W. Struewing

It is certified that error appears in the above-identified patent and that said Letters Patent is hereby corrected as shown below:

Column 2, Line 50    Delete the word "volumes" and insert the word --volume--.

Column 2, Line 52    After the word "treatment", insert the word --zone--.

Column 4, Line 16    Delete the word "through" and insert the word --trough--.

Column 5, Line 13    Delete "124" and insert --14--.

Signed and Sealed this

First Day of February, 1994

Attest:

BRUCE LEHMAN

Attesting Officer

Commissioner of Patents and Trademarks